(12) United States Patent
Sugaya

(10) Patent No.: US 9,710,688 B2
(45) Date of Patent: Jul. 18, 2017

(54) STEREOSCOPIC INFORMATION CODE AND STEREOSCOPIC INFORMATION CODE READING DEVICE

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/049,183

(22) Filed: Feb. 22, 2016

(65) Prior Publication Data
US 2017/0132445 A1    May 11, 2017

(30) Foreign Application Priority Data
Nov. 5, 2015   (JP) .................................. 2015-217628

(51) Int. Cl.
*G06K 7/14*     (2006.01)
*G06K 19/06*    (2006.01)

(52) U.S. Cl.
CPC ......... *G06K 7/1491* (2013.01); *G06K 7/1413* (2013.01); *G06K 19/06028* (2013.01)

(58) Field of Classification Search
CPC .......................................... G06K 7/14–7/1495
See application file for complete search history.

(56) References Cited

U.S. PATENT DOCUMENTS

| | | | | |
|---|---|---|---|---|
| 5,439,224 A | * | 8/1995 | Bertoncino | A63B 71/0669 473/153 |
| D382,611 S | * | 8/1997 | Lai | D21/713 |
| 5,738,350 A | * | 4/1998 | Lai | A63F 7/048 273/139 |
| 7,520,827 B1 | * | 4/2009 | Esposito | A63B 67/04 473/475 |
| 7,802,730 B2 | * | 9/2010 | Senda | G06K 7/14 235/487 |
| 7,901,945 B2 | * | 3/2011 | Meiring | G06K 7/14 356/904 |
| 8,721,468 B1 | * | 5/2014 | Barrett | A63B 37/0003 473/200 |
| 2006/0170230 A1 | * | 8/2006 | Lee | A63B 24/0021 294/19.2 |
| 2009/0137053 A1 | * | 5/2009 | Kishii | C12Q 1/6869 436/94 |

(Continued)

FOREIGN PATENT DOCUMENTS

JP      2013-69200 A    4/2013

*Primary Examiner* — Christie I Marshall
(74) *Attorney, Agent, or Firm* — Lex IP Meister, PLLC.

(57) ABSTRACT

The present invention is to easily read out an information code. A stereoscopic information code includes a plurality of same information codes arranged on the surface of a stereoscopic object at equal distances; and an alignment mark placed near each of the information codes. The stereoscopic information code reading device includes a scan unit that obtains a scanned image of the surface of stereoscopic object; an alignment mark distinguishing unit that distinguishes at least two alignment marks from the scanned image obtained by the scan unit; and an information code reading unit that reads an information code existing between two of the alignment marks distinguished by the alignment mark distinguishing unit.

6 Claims, 6 Drawing Sheets

(56) References Cited

U.S. PATENT DOCUMENTS

2009/0192731 A1\* 7/2009 De Jesus ............. E21B 47/0006
  702/42
2009/0303181 A1\* 12/2009 Hama ...................... G01D 5/28
  345/161
2012/0002257 A1\* 1/2012 Shirakura .............. G03H 1/265
  359/22

\* cited by examiner

STEREOSCOPIC INFORMATION CODE AND STEREOSCOPIC INFORMATION CODE READING DEVICE

CROSS REFERENCE TO RELATED APPLICATIONS

This application claims priority to Japanese Patent Application No. 2015-217628 filed on Nov. 5, 2015, the entire contents of which are incorporated by reference herein.

TECHNICAL FIELD

The present invention relates to an information code and an information code reading device.

BACKGROUND ART

The technology to print a bar code on an object and read out the bar code with a bar code reading device is known. Patent Document 1 discloses a bar code reading device that generates flat-image data of a bar code attached to a columnar or an oval article and extended in the circumferential direction based on an image data obtained from the bar code and decodes the bar code by using the flat-image data.

CITATION LIST

Patent Literature

Patent Document 1: JP 2013-69200A

SUMMARY OF INVENTION

A conventional bar code reading device cannot read a bar code without opposing the front of the bar code on a one-to-one basis. This requires the user to find a bar code printed on or attached to an object and then make the bar code reading device oppose to the front of the found bar code. This causes the user to consume time.

Therefore, an objective of the present invention is to provide a stereoscopic information code and a stereoscopic information code reading device that are capable of easily reading out an information code.

A stereoscopic information code according to one embodiment of the present invention includes:
  a plurality of same information codes arranged on the surface of a stereoscopic object at equal distances; and
  an alignment mark placed near each of the information codes as a mark that identifies one information code from the plurality of information codes.

A stereoscopic information code reading device is a device that reads a stereoscopic information code, which includes:
  a scan unit that obtains a scanned image of the surface of the stereoscopic information code;
  an alignment mark distinguishing unit that distinguishes at least two alignment marks from the scanned image obtained by the scan unit; and
  an information code reading unit that reads an information code existing between two of the alignment marks distinguished by the alignment mark distinguishing unit.

This enables the stereoscopic information code reading device to read out a stereoscopic information code.

The shape of the stereoscopic object on which a stereoscopic information code is attached may be a sphere.

This enables the stereoscopic information code reading device to read out a stereoscopic information code from various directions.

The shape of the information code may be a rectangle, and the alignment mark may be placed near each of the two points located at the opposing corners of the information code. The information code reading unit may select two of a plurality of alignment marks distinguished by the alignment mark distinguishing unit and judge whether or not an information code exists between the selected two alignment marks.

This enables the stereoscopic information code reading device to specify the area where an information code is arranged in a scanned image obtained by the scan unit based on the alignment marks.

The shape of the information code may be a rectangle, the alignment mark may be placed near each of the two points located at the opposing corners of the information code, and the two alignment marks placed at the opposing corners of the information code may L-shaped ones opposing each other. The information code reading unit may select the opposed two of a plurality of alignment marks distinguished by the alignment mark distinguishing unit and reads an information code existing between the selected two alignment marks.

This enables the stereoscopic information code reading device to read out a stereoscopic information code from a scanned image obtained by the scan unit.

According to the present invention, an information code is easily read out.

DESCRIPTION OF EMBODIMENTS

Embodiments of the present invention will be described below with reference to the attached drawings. However, this is illustrative only, and the technological scope of the present invention is not limited thereto. When the same kind of components is distinctively explained below, reference signs, for example, "alignment mark 24a" and "alignment mark 24b," are used. However, when the same kind of components is not distinctively explained, only the common number of reference signs, for example, "alignment marks 24" may be used.

Figure 1:
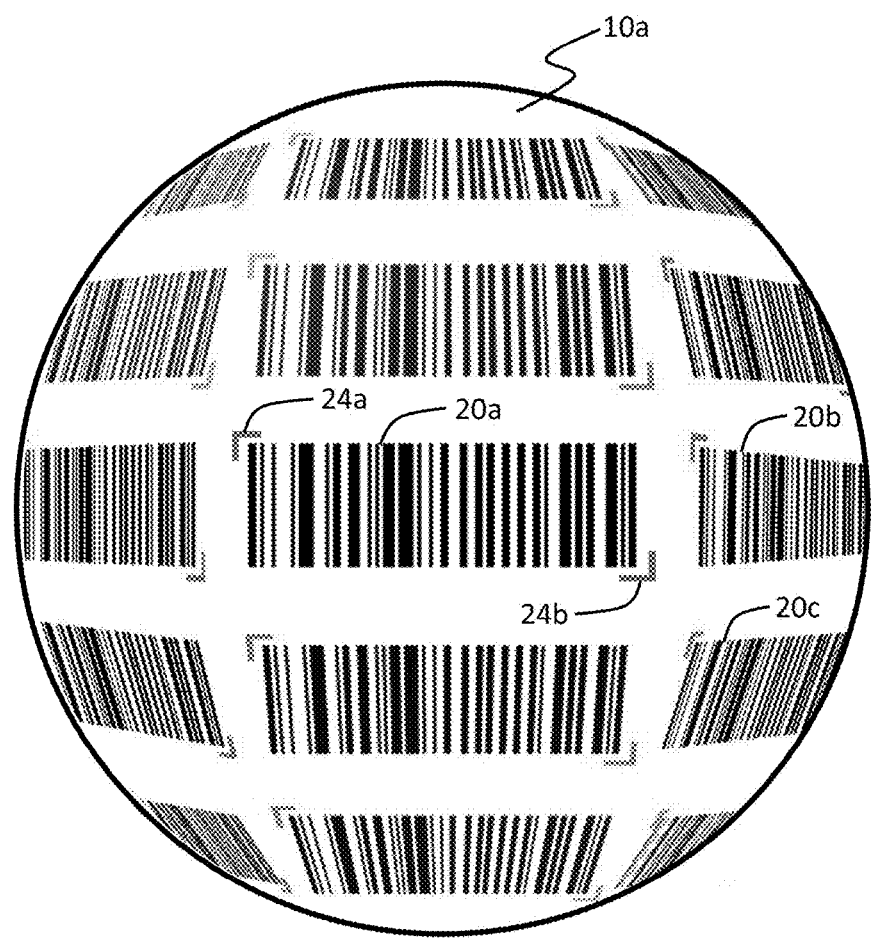
FIG. 1 is a pattern diagram showing an example spherical information code.

FIG. 1 is a pattern diagram showing an example of the spherical information code 10a.

For example, the spherical information code 10a as one example of the stereoscopic information code 10 has a plurality of same information codes 20 arranged on the entire surface of a sphere as one example of the stereoscopic object.

The information code 20 is a one-dimensional code such as a bar code, a two-dimensional code such as a QR Code®, or a three-dimensional code such as a QR Code® including color information.

An alignment mark 24 may be placed near each of the information codes 20. The alignment mark 24 is to enable the stereoscopic information code reader 60 (see FIG. 4) as one example of the stereoscopic information code reading device to specify the boundary of an information code 20. Details of the alignment mark 24 will be described later (see FIG. 3).

A plurality of same information codes 20 may be arranged in the entire surface of a sphere. This enables the stereoscopic information code reader 60 to read out an information code 20 from any directions of the stereoscopic information code 10. In other words, even if an information code reader does not oppose an information code on a one-to-one basis, the stereoscopic information code reader 60 can read out a stereoscopic information code 10.

The information code 20 does not have to be arranged in the entire surface of a sphere and may be arranged on only a predetermined part of the surface of a sphere (e.g. hemisphere face), for example.

Figure 2:
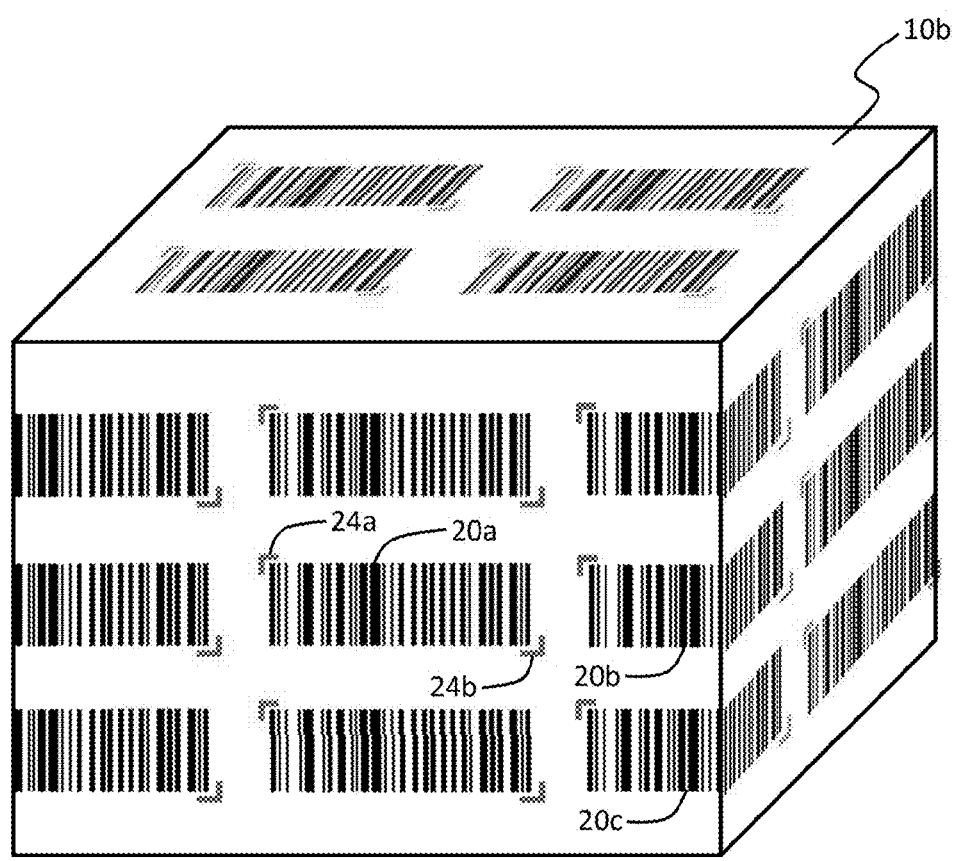
FIG. 2 is a pattern diagram showing an example polyhedral information code.

FIG. 2 is a pattern diagram showing an example polyhedral information code 10b.

The shape of the stereoscopic information code 10 is not limited to a sphere. For example, the stereoscopic information code 10 may be polyhedral (hexahedral) information code 10b as shown in FIG. 2. The shape may be an ellipsoid, a cone, a cylinder, etc.

The information code 20 does not have to be arranged on all the surfaces of a polyhedron and may be arranged on only some of the surfaces of a polyhedron, for example.

Figure 3:
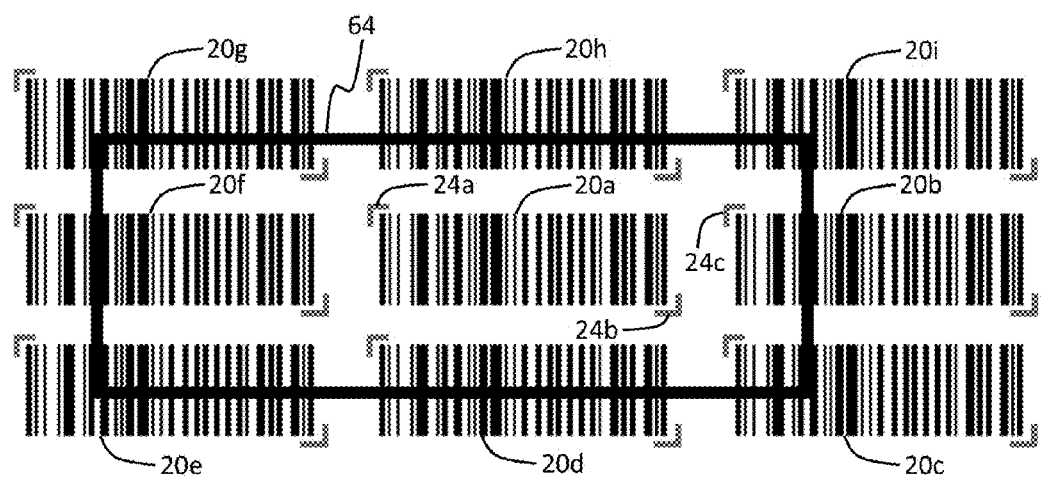
FIG. 3 is a pattern diagram illustrating the role of the alignment marks.

FIG. 3 is a pattern diagram illustrating the role of the alignment marks 24.

When the shape of the information code 20 is an approximate rectangle (e.g., bar code or QR Code®, the alignment marks 24a and 24b may be placed near each of the two points located at the opposing corners of one information code 20. This enables the stereoscopic information code reader 60 to recognize the sides of the approximate rectangle with the two alignment marks 24a and 24b placed at the opposing corners as the boundary of an information code 20

In the stereoscopic information code 10, the information codes 20a and 20b may be arranged at approximately equal intervals from each other. The intervals are equal to or more than that defined as a quiet zone according to a standard of the information code 20. However, when an alignment mark 24 may be placed near each of the information codes 20, the intervals may be less than that defined as the quiet zone. This is because the stereoscopic information code reader 60 can recognize the boundary of one information code 20 by the alignment mark 24.

Since a plurality of information codes 20 are arranged, for example, one or more complete information codes 20 and one or more incomplete information codes 20 (e.g., a part of information code 20b and 20c) may be included in the reading frame 64 of the stereoscopic information code reader 60. For example, the reading frame 64 of the stereoscopic information code reader 60 in FIG. 3 includes one complete information code 20a and eight incomplete information codes 20b to 20i.

Then, the stereoscopic information code reader 60 can recognize the boundary of the information code 20 by alignment marks 24 to read out at least one complete information code 20a.

For example, the stereoscopic information code reader 60 detects the detection area of the approximate rectangle information code 20a with two alignment marks 24a and 24b placed at the opposing corners. This enables the stereoscopic information code reader 60 to read out one complete information code 20a in the detection area.

If at least one of the two alignment marks 24 is of an incomplete information code 20, the detection area formed by the two alignment marks 24 does not include an information code 20 (i.e., this detection area corresponds to a space between information codes 20). For example, the detection area formed with alignment marks 24b and 24c in FIG. 3 does not include an information code 20. This can prevents the stereoscopic information code reader 60 from reading an incomplete information code 20.

The alignment mark 24 may have any shapes such as a circle and a square but preferably has an approximate L-shape to form a corner of an approximate rectangle. This enables the stereoscopic information code reader 60 to recognize that at least one complete information code 20 exists in a detection area enclosed with two L-shaped marks. In other words, the judgment whether or not the detection area include an information code 20 as described above is not required.

Figure 4:
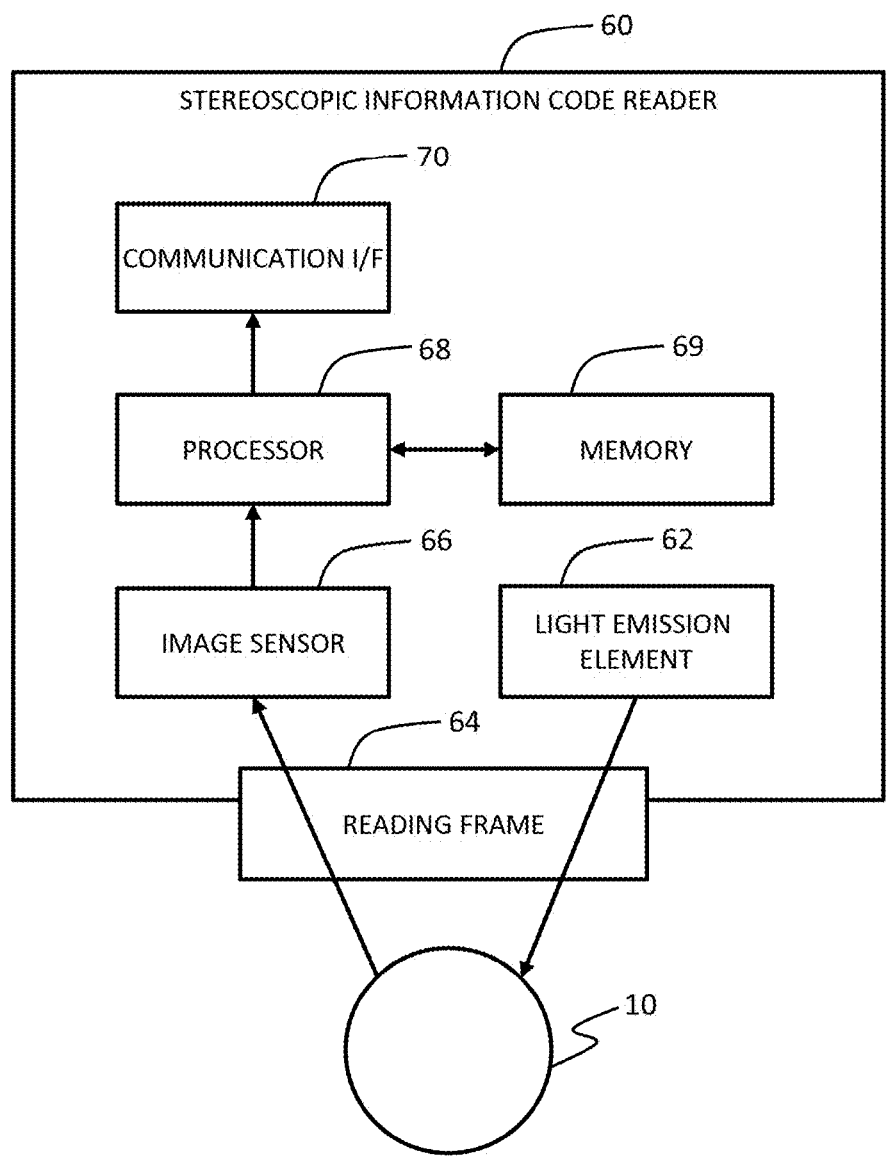
FIG. 4 shows an example of the hardware configuration of the stereoscopic information code reader.

FIG. 4 shows an example of the hardware configuration of the stereoscopic information code reader 60.

The stereoscopic information code reader 60 may have a light emission element 62, an image sensor 66, a processor 68, a memory 69, a communication interface (hereinafter referred to as "I/F") 70, and a reading frame 64.

The light emission element 62 is capable of light emitting. Examples of the light emission element 62 include a light emitting diode (hereinafter referred to as "LED") and a laser. The stereoscopic information code reader 60 may not have a light emission element 62 when using natural light.

The image sensor 66 is a device with a capability of light receiving. Examples of the image sensor 66 include a complementary MOS (hereinafter referred to as "CMOS") area sensor or a charge-coupled device (hereinafter referred to as "CCD") area sensor.

The memory 69 is a device with a capability of information storage. The memory 69 may store a program, data, etc. to achieve the functions of the stereoscopic information code reader 60.

The processor 68 is a device with a capability of logical operation. The processor 68 may achieve various functions of the stereoscopic information code reader 60 by executing programs read out from the memory 69. Details of these functions will be described later.

The communication I/F 70 is to connect the stereoscopic information code reader 60 with an external device.

To the reading frame 64, reflected light from a stereoscopic information code 10 is input. The reading frame 64 may have a size and a shape to include at least one information code 20 even if the stereoscopic information code reader 60 is applied from any directions of the stereoscopic information code 10. When the shape of the information code 20 is an approximate rectangle (e.g., bar code or QR Code®, the length of each side of the reading frame may be more than twice that of the information code 20.

When the stereoscopic information code reader 60 may be applied to the stereoscopic information code 10, the area included in the reading frame 64 may be scanned by the image sensor 66 to form a scanned image. The processor 68 may read and output the value of an information code 20 included in the scanned image to an external device through the communication I/F 70.

Figure 5:
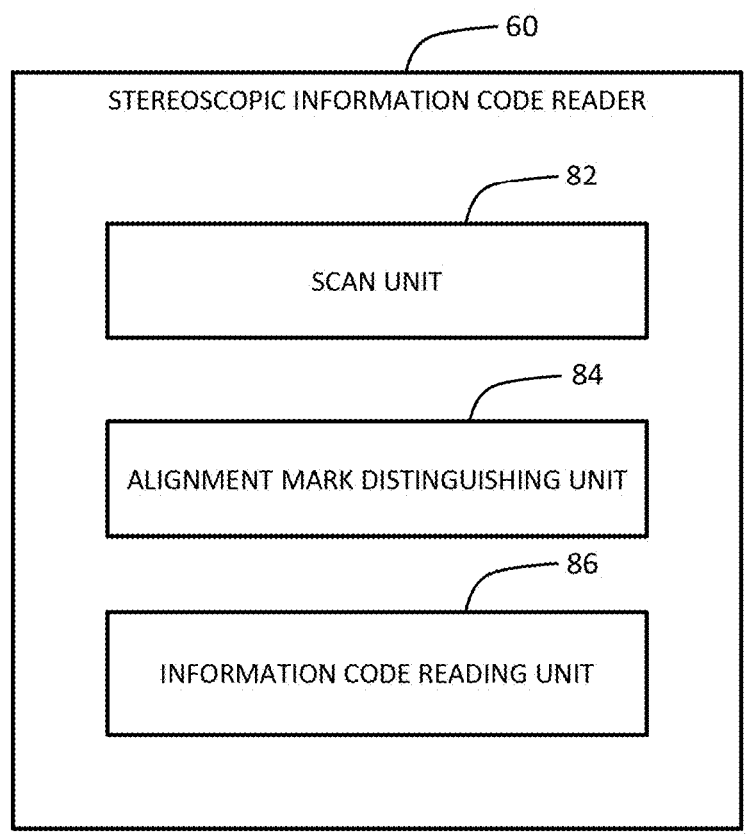
FIG. 5 shows an example of the functions of the stereoscopic information code reader.

FIG. 5 shows an example of the functions of the stereoscopic information code reader 60.

The stereoscopic information code reader 60 may have a scan unit 82, an alignment mark distinguishing unit 84, and an information code reading unit 86 as functions. These functions may be stored in the memory 69 as a program. The processor 68 may achieve these functions by reading out and executing a program from the memory 69.

The scan unit 82 controls the light emission element 62 and the image sensor 66 to scan the area of the reading frame 64. Then, the scan unit 82 forms an image of the scanned area (scanned image).

When the scanned image is distorted, the scan unit 82 may correct the distortion.

For example, when a spherical information code 10a as shown in FIG. 1 is scanned, an information code 20a included in the scanned image is distorted because of the curved surface of the sphere. In this case, the scan unit 82 may perform curved surface correction on this scanned image to generate a flat image as shown in FIG. 3.

For example, if a side of the polyhedron of a polyhedral information code 10b as shown in FIG. 2 is scanned, an information code 20b included in the scanned image is bent. In this case, the scan unit 82 may perform bent surface correction on this scanned image to generate a flat image as shown in FIG. 3.

The alignment mark distinguishing unit 84 distinguishes an alignment mark 24 from the scanned image formed by the scan unit 82. If the alignment mark 24 has an L-shape, the alignment mark distinguishing unit 84 may specify the location and the orientation of the L-shaped mark from the scanned image.

The information code reading unit 86 identifies an information code 20 from the scanned image based on the alignment mark 24 distinguished by the alignment mark distinguishing unit 84 and reads out the value of the identified information code 20. The information code reading unit 86 may output the value of the read-out information code 20 to an external device through the communication I/F 70.

The information code reading unit 86 may select two of a plurality of alignment marks 24 distinguished by the alignment mark distinguishing unit 84 and judge whether or not an information code 20 exists between the selected two alignment marks 24 (in the detection area). Specifically, the information code reading unit 86 may judge whether or not the detection area includes an information code 20 or a space (blank) between information codes 20. For example, if all almost pixel values in the detection area are "white," the information code reading unit 86 may judge the detection area is a space (blank) between information codes 20. If not, the information code reading unit 86 may judge that an information code 20 exists. If judging that an information code 20 exists, the information code reading unit 86 may read the value of an information code 20 existing between the two selected alignment marks 24.

If the alignment mark 24 has an L-shape, the information code reading unit 86 may select two opposing to each other of a plurality of alignment marks 24 (L-shaped marks) distinguished by the alignment mark distinguishing unit 84 and read the value of at least one complete information code 20 existing between the two selected alignment marks 24 (in the detection area). This can omit the judgement whether or not an information code 20 exists in the detection area as described above.

If the alignment mark 24 has an L-shape, the information code reading unit 86 may select the closest two opposing to each other of a plurality of alignment marks 24 (L-shaped marks) distinguished by the alignment mark distinguishing unit 84 and read the value of a complete information code 20 existing between the two selected alignment marks 24 (in the detection area). This can immediately specify the detection area including one complete information code 20.

Figure 6:
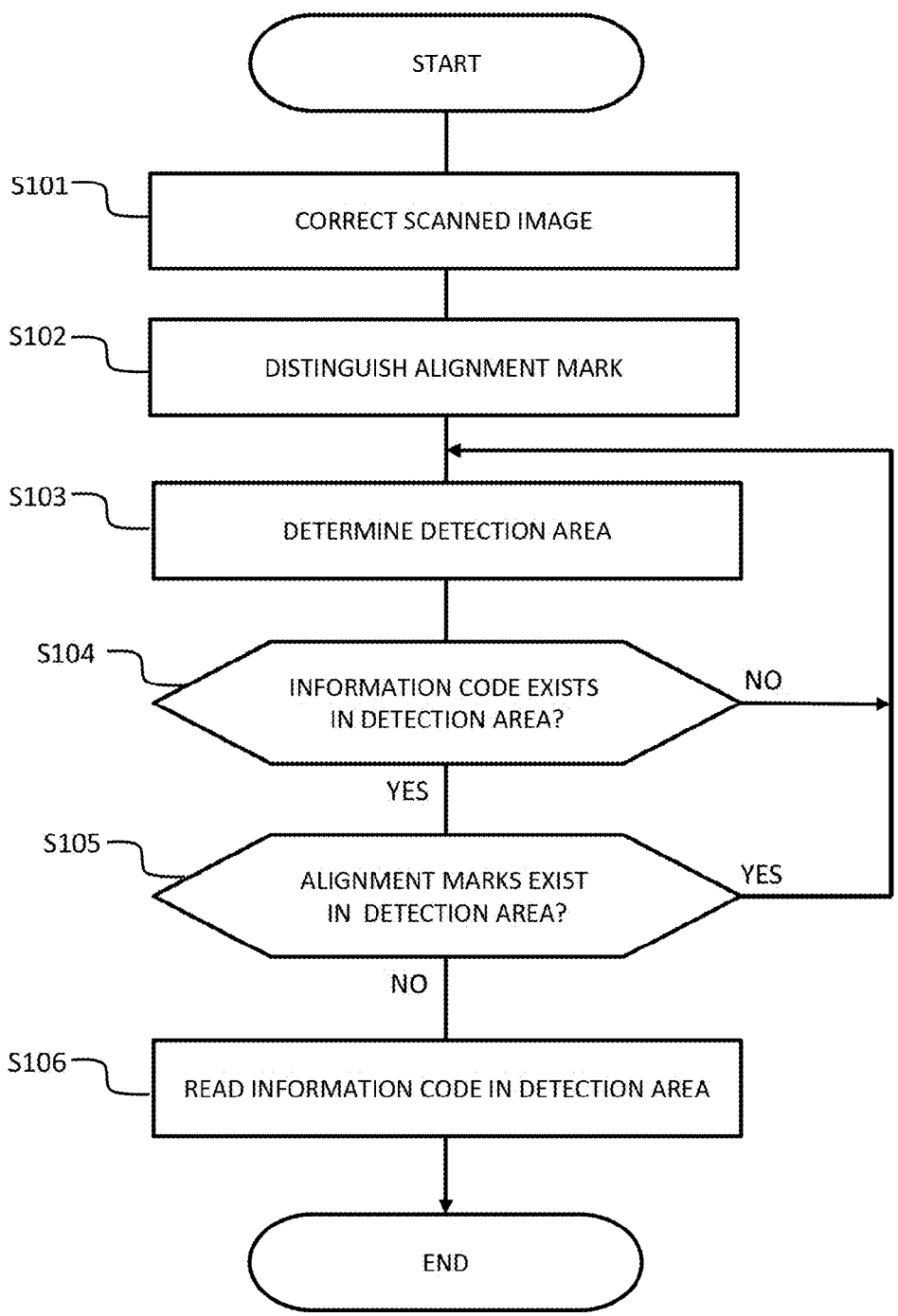
FIG. 6 is a flow chart showing an operation example of the stereoscopic information code reader.

FIG. 6 is a flow chart showing an operation example of the stereoscopic information code reader 60.

The scan unit 82 forms a scanned image of the reading frame. The scan unit 82 corrects the scanned image to a flat form as appropriate (step S101).

Then, the alignment mark distinguishing unit 84 distinguishes an alignment mark 24 from the scanned image formed in the step S101 (step S102).

Then, the information code reading unit 86 selects two alignment marks 24 from a plurality of alignment marks 24 distinguished in the step S102 to determine the detection area (step S103).

The information code reading unit 86 judges whether or not an information code 20 exists between the two selected alignment marks 24 (in the detection area) (step S104).

If judging that no information code 20 exists in the step S104 (NO), the information code reading unit 86 returns to the step S103 and selects other alignment marks 24 to determine another detection area. In this case, the detection area has a space (blank) between information codes 20.

If judging that an information code 20 exists in the step S104 (YES), the information code reading unit 86 judges whether or not alignment marks 24 other than the alignment marks 24 selected in the step S103 exist in the detection area (step S105).

If judging that other alignment marks 24 exist in the step S105 (YES), the information code reading unit 86 returns to the step S103 and selects the alignment marks 24 existing in the detection area to determine a smaller detection area. This is to narrow down to one information code 20.

If judging that no other alignment marks 24 exist in the step S105 (NO), the information code reading unit 86 reads the value of one information code 20 in the detection area (step S106).

The above-mentioned process enables the stereoscopic information code reader 60 to read out the value of the stereoscopic information code 10.

If the alignment mark 24 has an L-shape, the stereoscopic information code reader 60 may distinguish the closest two alignment marks opposing to each other in the step S103 and skip the steps S104 and S105. This is because the detection area including one information code 20 is immediately specified in the step S103.

The embodiments of the present invention are described above. However, the present invention is not limited to the above-mentioned embodiments. The effect described in the embodiments of the present invention is only the most preferable effect produced from the present invention. The effects of the present invention are not limited to that described in the embodiments of the present invention.

For example, the scan unit 82 corrects the distortion of a scanned image in the above-mentioned embodiments. However, other units 84 and 86 may correct the distortion.

For example, the stereoscopic information code reader 60 may be achieved by a camera and a predetermined application installed in a mobile phone, a smart phone, a small PC, etc. For example, the surface of the stereoscopic information code 10 may be taken with a camera. Then, the taken image may be processed by an application with functions corresponding to the above-mentioned scan unit 82, alignment mark distinguishing unit 84, and information code reading unit 86.

REFERENCE SIGNS LIST

10: Stereoscopic information code
20: Information code
24: Alignment mark
60: Stereoscopic information code reader
82: Scan unit
84: Alignment mark distinguishing unit
86: Information code reading unit

What is claimed is:

1. A stereoscopic information code reading device with a capability of reading a stereoscopic information code including a plurality of same information codes arranged on the surface of a stereoscopic object at equal distances, and an alignment mark placed near each of the information codes as a mark that identifies one information code from the plurality of information codes, the device comprising:
   a scan unit that obtains a scanned image of the surface of the stereoscopic object;
   an alignment mark distinguishing unit that distinguishes at least two alignment marks from the scanned image obtained by the scan unit; and
   an information code reading unit that reads an information code existing between two of the alignment marks distinguished by the alignment mark distinguishing unit.

2. The stereoscopic information code reading device according to claim 1, wherein
   the shape of the information code is a rectangle, and the alignment mark is at least placed near each of the two points located at the opposing corners of the information code, and
   the information code reading unit selects two of a plurality of alignment marks distinguished by the alignment mark distinguishing unit and judges whether or not an information code exists between the selected two alignment marks.

3. The stereoscopic information code reading device according to claim 1, wherein
   the shape of the information code is a rectangle,
   the alignment mark is at least placed near each of the two points located at the opposing corners of the information code,
   the two alignment marks placed at the opposing corners of the information code are L-shaped ones opposing each other, and
   the information code reading unit selects the opposed two of a plurality of alignment marks distinguished by the alignment mark distinguishing unit and reads an information code existing between the selected two alignment marks.

4. The stereoscopic information code reading device according to claim 3, wherein the information code reading unit selects the closest two opposing each other of a plurality of alignment marks distinguished by the alignment mark distinguishing unit.

5. The stereoscopic information code reading device according to claim 1, wherein the stereoscopic object is a sphere, and the scan unit performs curved surface correction on the scanned image.

6. The stereoscopic information code reading device according to claim 1, wherein the alignment mark is away from a corner of the information code by a predetermined interval.

* * * * *